United States Patent Office 3,624,894
Patented Dec. 7, 1971

3,624,894

SEALING TECHNIQUE FOR TRANSPARENT LIDS ON INTEGRATED CIRCUIT PACKAGES

Ralph W. Miller, Manhattan Beach, Calif., assignor to TRW Inc., Redondo Beach, Calif.

No Drawing. Filed Oct. 29, 1969, Ser. No. 872,396
Int. Cl. B23k *31/02*
U.S. Cl. 29—473.1 2 Claims

ABSTRACT OF THE DISCLOSURE

Where thin film resistors in an integrated circuit require laser adjustment, an optically true transparent lid is hermetically sealed to the base flatpack. The lid is vapor plated with chromium in a predetermined pattern followed by a coating of gold. A hermetic seal which maintains its integrity under moderate thermal shock conditions is formed by soldering to the flatpack.

In copending application Ser. No. 788,719 filed Jan. 3, 1969, entitled "Semiconductor Product and Process of Manufacture Thereof," a process is described for adjusting the resistance of thin film resistors in a semiconductor microelectronic device package using light from a laser source. This resistor adjustment using a laser requires a cap or window which was a high degree of optical perfection. In addition to maintaining the optical clarity or integrity, the cap or window must be hermetically sealed to preclude contamination by moisture or dirt.

In the past, hermetic seals have been effected by heating a clean glass lid until it softens. Then, a Kovar frame is pressed into the glass. This frame is then low-temperature soldered to the flatpack to effect the final seal. Heating the glass to the softening point results in deterioration of the optical qualities of the glass.

It has now been discovered that a combination of chromium and gold may be applied to the glass cap to effect a solderable surface and hermetic seal. The chromium-gold seal provides a material which can be sealed to the glass surface and also soldered, without resorting to a high heat input which would damage the circuit inside or possibly distort the optical properties of the glass.

Briefly, the method for sealing the glass to the flatpack involves cleaning the glass surface, evaporting the chromium and gold onto the glass, exposing a photo resist, etching the chrome and gold, and removing the exposed photo resist material. After the metals have been coated and the photo resist removed, the lids are cut into the desired size and inspected for scratches. A layer of gold-tin solder is applied to the edge of the flatpack, and the lid is placed on the flatpack. The unit assembly is placed in a furnace to melt the solder and effect the seal.

Chromium may be vapor deposited upon the glass to a depth of 500 A., preferably, although it should be understood that larger or smaller amounts will be readily effective. After the chromium has been deposited, gold is evaporated onto the chromium to a depth of 25,000 A., preferably. Because it is difficult to vapor deposit 25,000 A., the preferred expedient is to vapor deposit 1,000–2,000 A., and then subsequent to the etching step the balance of the gold is electrochemically deposited on the thin gold layer. Again, it should be understood there is a reasonably wide variation of the amount of gold which may be plated without disturbing the ability to effect a satisfactory seal.

So that the details of the present invention may be better understood, the following examples shows one stepwise embodiment, for sealing transparent lids on the integrated circuit package.

EXAMPLE

A glass substrate measuring 1½" x 2½" was placed in a solution of a surfactant and water for approximately twenty minutes. The bath was then subjected to ultrasonic vibrations for approximately five minutes. The glass substrate was then removed from the ultrasonic bath and rinsed for twenty minutes in deionized water and subsequently rinsed with methyl alcohol and blown dry in air. The glass substrate was then subjected to isopropyl alcohol vapor for final degreasing. Upon completion of the cleaning the substrate was then placed in a vacuum chamber and chromium heated by an electron beam source was vaporized and deposited on the surface of the glass to a depth of 500 A. A gold source was substituted for the chromium and the vapor deposition process was repeated until a 1,000–2,000 A. depth was achieved. A polymeric photoresist coating was applied to the gold surface and exposed to light having a multiple rectangular pattern. The nonexposed polymeric photo resist was then stripped in a bath leaving the center of the rectangles with an exposed gold and chromium surface. The glass substrate was then placed in an etchant to remove the chromium and gold. The exposed portion of the photo resist was then removed by oxidation, and 24,000–23,000 A. of gold was electrochemically deposited on the initial gold coating on the glass plate. A diamond saw using a high temperature wax was used to trim the glass substrate into the desired lids. An optical inspection was made of the lids to determine if any scratches were present. The lids were then sealed on to the flatpack using a gold-tin solder preform heated in a belt furnace.

I claim:

1. A method for sealing glass transparent lids on integrated circuit flatpacks comprising:
   (A) depositing chromium on the transparent lid,
   (B) depositing gold on said chromium,
   (C) etching said chromium and said gold in a predetermined pattern, and
   (D) soldering said chromium-gold plated lid to a flatpack with gold-tin solder.

2. A method for sealing glass transparent lids on integrated circuit flatpacks comprising:
   (A) cleaning the transparent lid,
   (B) vapor depositing chromium on said lid,
   (C) depositing gold on said chromium,
   (D) applying a polymeric photoresist to said gold,
   (F) etching said chromium and gold,
   (G) removing exposed photoresist, and
   (H) soldering said chromium-gold plated lid to a flatpack with gold-tin solder.

References Cited

UNITED STATES PATENTS

| | | | |
|---|---|---|---|
| 2,421,607 | 6/1947 | Fowler | 29—502 X |
| 3,173,201 | 3/1965 | Motson | 29—473.1 |
| 3,312,540 | 4/1967 | Plumbo et al. | 174—DIG 3 |
| 3,323,204 | 6/1967 | Goeckel et al. | 29—473.1 |
| 3,339,269 | 9/1967 | Hanink | 29—488 |
| 3,370,343 | 2/1968 | Martin | 29—488 X |
| 3,404,319 | 10/1968 | Tsuji et al. | 174—DIG 3 |
| 3,469,684 | 9/1969 | Keady et al. | 174—DIG 3 |
| 3,509,430 | 4/1970 | Mroz | 174—DIG 3 |
| 3,538,597 | 11/1970 | Leinkram | 174—DIG 3 |

CHARLIE T. MOON, Primary Examiner

R. B. LAZARUS, Assistant Examiner

U.S. Cl. X.R.

29—472.9; 174—DIG 3

UNITED STATES PATENT OFFICE

CERTIFICATE OF CORRECTION

Patent No. 3,624,894 Dated December 7, 1971

Inventor(s) Ralph W. Miller

It is certified that error appears in the above-identified patent and that said Letters Patent are hereby corrected as shown below:

In Claim 2, column 2, between lines 45 and 46 insert

-- (E) removing unexposed polymeric photoresist, --.

Signed and sealed this 18th day of February 1975.

(SEAL)
Attest:

RUTH C. MASON
Attesting Officer

C. MARSHALL DANN
Commissioner of Patents
and Trademarks